(12) United States Patent
Schwarze et al.

(10) Patent No.: US 9,487,112 B2
(45) Date of Patent: Nov. 8, 2016

(54) VEHICLE SEAT WITH A DEFORMATION DEVICE

(71) Applicant: BROSE FAHRZEUGTEILE GMBH & CO. KOMMANDITGESELLSCHAFT, COBURG, Coburg (DE)

(72) Inventors: Peter Schwarze, Lautertal (DE); Joern Reinecke, Coburg (DE)

(73) Assignee: BROSE FAHRZEUGTEILE GmbH & CO. KOMMANDITGESELLSCHAFT, COBURG, Coburg (DE)

( * ) Notice: Subject to any disclaimer, the term of this patent is extended or adjusted under 35 U.S.C. 154(b) by 191 days.

(21) Appl. No.: 14/361,277

(22) PCT Filed: Nov. 26, 2012

(86) PCT No.: PCT/EP2012/004877
§ 371 (c)(1),
(2) Date: May 28, 2014

(87) PCT Pub. No.: WO2013/079185
PCT Pub. Date: Jun. 6, 2013

(65) Prior Publication Data
US 2014/0339865 A1 Nov. 20, 2014

(30) Foreign Application Priority Data
Nov. 30, 2011 (DE) .................... 10 2011 055 860

(51) Int. Cl.
*B60N 2/427* (2006.01)
*B60N 2/42* (2006.01)
(52) U.S. Cl.
CPC ......... *B60N 2/42745* (2013.01); *B60N 2/4228* (2013.01); *B60N 2/42709* (2013.01)
(58) Field of Classification Search
CPC .................................................. B60N 2/42709
USPC ..................... 297/216.1, 216.13, 216.14
See application file for complete search history.

(56) References Cited

U.S. PATENT DOCUMENTS 5,588,609 A * 12/1996 Ohsumi ................. B60R 22/42
242/376
(Continued)

FOREIGN PATENT DOCUMENTS

CN 1093324 A 10/1994
CN 1603160 A 4/2005
(Continued)

OTHER PUBLICATIONS

English translation of International Preliminary Report on Patentability for International Application No. PCT/EP2012/004877, Issued Jun. 3, 2014, 7 sheets.
(Continued)

*Primary Examiner* — David E Allred
(74) *Attorney, Agent, or Firm* — Lewis Roca Rothgerber Christie LLP (57) ABSTRACT

A vehicle seat with a seat part and a backrest structure is provided. The seat part includes a first seat component, at which a second seat component connected with the backrest structure is fixed, when the backrest structure is present in a proper position of use. A deformation device with at least one deformation element fixed at one of the seat components is provided, which in the case of a crash upon exceedance of a specified threshold value of a force acting on the backrest structure permits a displacement of the second seat component relative to the first seat component by deforming the at least one deformation element. The deformation device includes at least one oblong hole which specifies a deformation path along which a displacement of the second seat component is effected after exceedance of the threshold value. A fastening element is provided, which fixes the deformation element and at least one seat component to each other, which with a bearing portion engages into the oblong hole at the other seat component, and which is held in a specified position by the deformation element, when the backrest structure is present in a proper position of use.

21 Claims, 5 Drawing Sheets

(56) References Cited

U.S. PATENT DOCUMENTS

| | | | | |
|---|---|---|---|---|
| 5,588,611 | A * | 12/1996 | Osumi | B60R 22/42 |
| | | | | 242/381.1 |
| 5,927,804 | A * | 7/1999 | Cuevas | B60N 2/4838 |
| | | | | 297/216.12 |
| 6,648,409 | B1 * | 11/2003 | Laporte | B60N 2/42718 |
| | | | | 297/216.1 |
| 7,854,477 | B2 * | 12/2010 | Axelsson | B60N 2/4228 |
| | | | | 297/216.1 |
| 8,777,308 | B2 * | 7/2014 | Lee | B60N 2/4228 |
| | | | | 297/216.13 |
| 9,199,554 | B2 * | 12/2015 | Muller | B60N 2/01583 |
| 2005/0077763 | A1 * | 4/2005 | Kawashima | B60N 2/42745 |
| | | | | 297/216.14 |
| 2005/0104384 | A1 | 5/2005 | Kondo et al. | |
| 2005/0134099 | A1 * | 6/2005 | Masutani | B60R 22/26 |
| | | | | 297/216.1 |
| 2005/0140190 | A1 * | 6/2005 | Kawashima | B60N 2/4228 |
| | | | | 297/216.14 |
| 2006/0263164 | A1 * | 11/2006 | Dowty | B64D 11/0619 |
| | | | | 410/105 |
| 2008/0136225 | A1 | 6/2008 | Murphy et al. | |
| 2010/0194157 | A1 * | 8/2010 | Nitsuma | B60N 2/4228 |
| | | | | 297/216.1 |
| 2013/0200666 | A1 * | 8/2013 | Huttemann | B60N 2/42709 |
| | | | | 297/216.1 |

FOREIGN PATENT DOCUMENTS

| | | |
|---|---|---|
| CN | 101195353 A | 6/2008 |
| DE | 199 53 758 C1 | 3/2001 |
| DE | 103 17 238 A1 | 10/2004 |
| DE | 10 2008 019 917 B3 | 7/2009 |
| DE | 10 2009 058 820 A1 | 8/2010 |
| EP | 2 123 506 A1 | 11/2009 |
| FR | 2 798 629 A1 | 3/2001 |
| GB | 2 269 986 A | 3/1994 |
| WO | WO 2006/041375 A1 | 4/2006 |

OTHER PUBLICATIONS

International Search Report corresponding to PCT/EP2012/004877, datedMar. 7, 2013, 7 pages.

* cited by examiner

VEHICLE SEAT WITH A DEFORMATION DEVICE

CROSS-REFERENCE TO A RELATED APPLICATION

This application is a National Phase Patent Application of International Patent Application Number PCT/EP2012/004877, filed on Nov. 26, 2012, which claims priority of German Patent Application Number 10 2011 055 860.8, filed on Nov. 30, 2011.

BACKGROUND

The present invention relates to a vehicle seat.

Such vehicle seat includes a seat part as well as a backrest structure coupled with the seat part. The seat part usually comprises a seat base which carries a seat cushion. The backrest structure comprises a backrest frame on which a backrest cushion is arranged for supporting the back of a seat user.

The backrest structure regularly is pivotally mounted relative to the seat part, in order to permit an adjustment of the swivel position of the backrest corresponding to the needs of the seat user and/or to provide for folding of the backrest onto the seat part. In a proper position of use of the backrest structure, in which the backrest can serve the support of the back of a seat user, the backrest structure is arrested in its position relative to the seat part.

In particular in a rear-end impact it was found to be advantageous to permit a displacement of the backrest structure relative to the seat part under a permitted plastic deformation of components provided therefor. The objective here is to reduce the loads caused on the occupant due to the acceleration, which otherwise would result in a serious cervical spine trauma. The seat part and the backrest structure each are connected with a seat component, which seat components are coupled with each other via a deformation device, so that in a proper position of use of the backrest structure the two seat components are fixed to each other and only in the case of a crash—upon exceedance of a specified threshold value of a force acting on the backrest structure—a displacement of the seat component associated to the backrest structure relative to the seat component fixed at the seat part is permitted by selectively deforming a deformation element.

From DE 10 2008 019 917 B3, for example, it is known to provide a deformation device in the form of a device absorbing a rear-end crash active energy with a deformation element forming two oblong holes. Two screw bolts, which are provided at the seat component of the seat part, preferably each engage in one of the two oblong holes of the deformation element, which is rigidly and immovably fixed at the seat component associated to the backrest structure. The width of the oblong holes each is chosen smaller than the diameter of the respectively associated screw bolt, so that the two screw bolts are fixed in the oblong holes in an ordinary position of use of the vehicle seat. When during a rear-end impact an increased force exceeding a specified threshold value now acts on the backrest structure, the screw bolts can be shifted in the associated oblong holes by expanding the oblong holes. Due to this plastic deformation, crash energy is absorbed. Furthermore, the oblong holes specify a deformation path along which the seat component rigidly connected with the backrest structure (e.g. via a locked seat fitting) is shifted in the case of a crash.

The vehicle seat proposed in DE 10 2008 019 917 B3 however appears to be disadvantageous in so far as the permitted deformation path is defined via a component which also carries parts of a backrest adjusting means and hence also must be designed correspondingly for these requirements. Thus, the deformation element possibly cannot optimally be adapted to the deformation desired in the case of a crash via its material properties or its geometry.

In addition, it cannot easily be ensured that in normal operation there is no slight expansion of the two oblong holes. The screw bolts then possibly no longer are arrested in the oblong holes, so that the seat component of the backrest structure or the deformation element fixed thereto do not permanently remain in a specified position with respect to the seat component to be rigidly fixed at the seat part.

SUMMARY

Therefore, it is an object of the present invention to further improve a vehicle seat as mentioned above and in particular to provide a vehicle seat which by means of a deformation device of rather simple construction is able to selectively absorb energy in the case of a crash.

This vehicle seat is equipped with a first seat component of the seat part—a seat part component—and with a second seat component connected with the backrest structure—a backrest component, wherein the second seat component is fixed at the first seat component when the backrest structure is present in a proper position of use. By means of a deformation device with at least one deformation element fixed at one of the seat components a displacement of the second seat component relative to the first seat component by deforming the at least one deformation element is permitted in the case of a crash upon exceedance of a specified threshold value of a force acting on the backrest structure. The deformation device includes at least one oblong hole which specifies a deformation path, along which a displacement of the second seat component is effected after exceedance of the threshold value.

According to an exemplary embodiment of the invention it furthermore is provided that the deformation device includes a fastening element fixing the deformation element and at least one seat component at each other. With a bearing portion this fastening element engages into the oblong hole, which according to the invention is provided at the other seat component, and by the deformation element is held in a specified position (specified by the deformation element), when the backrest structure is present in a proper position of use.

The oblong hole thus specifies a maximum path length, via which the fastening element engaging therein is shiftable in the case of a crash. However, a deformation of the fastening element or the oblong hole itself (initially) is not effected, but a deformation of the deformation element coupled with the fastening element. To selectively reduce energy in the case of a crash, a displacement of the backrest structure relative to the seat part by deforming the deformation element hence is permitted by allowing a displacement of the fastening element guided in the oblong hole only when the deformation element engaging the fastening element is deformed at the same time.

By guiding the fastening element via its bearing portion engaging into the oblong hole, a certain direction of deformation along which a deformation force acts on the deformation element is specified in the case of a crash in a simple way. In one design variant, the fastening element includes a pin-shaped bearing portion which extends through the oblong hole of the one seat component and is fixed at the other seat component with the portion extending through the oblong hole. The fastening element also can connect the deformation element and the two seat components with each other. In particular, the fastening element can extend through an opening or bore opposite the oblong hole of the one seat component in the other seat component and be fixed thereto, for example by a nut. The fastening element in particular can be designed as screw bolt, which one after the other extends through an opening in the deformation element, the oblong hole at the one seat component and an opposite opening of the other seat component, in order to connect the deformation element and the two seat components with each other.

In an alternative design variant, the fastening element for example also can be formed by a portion formed like a pin at the deformation element, which on the one hand extends through the oblong hole provided at the one seat component and on the other hand is fixed at the other seat component with the portion guided through the oblong hole.

The fixation at the other seat component in principle can be effected for example by a welding seam or in the case of the fastening element extending through an opening provided at the same by means of a nut.

As explained already, the deformation element preferably is formed such that it is deformable upon exceedance of the specified threshold value and thereby allows a displacement of the fastening element along the oblong hole. In the case of a crash, the bearing portion thus is shifted inside the oblong hole in a guided manner, wherein for this purpose the deformation element engaging the fastening element selectively is deformed at the same time, in order to thereby absorb energy. The fastening element preferably is immovably fixed at the seat component which is connected with the backrest structure and which subsequently is referred to as backrest component. In this exemplary embodiment, the oblong hole then is provided at the seat component of the seat part, the seat part component. Due to the increased force acting on the backrest structure and hence the backrest component in the case of a crash, the fastening element is shifted along the oblong hole and the deformation element fixed at the seat part component and engaging the fastening element thereby is deformed.

A connecting point at which the deformation element is fixed at the seat component provided with the oblong hole, preferably at the seat part component, therefore is spaced to the oblong hole, so that a deformable portion of the deformation element extends between the at least one connecting point and the fastening element.

In one exemplary design variant, the deformation element is fixed at the seat component including the oblong hole on at least two connecting points spaced from each other, and the fastening element is fixed or formed at a portion of the deformation element, which is located between two connecting points of the deformation element. Correspondingly, two portions of the deformation element spatially separate from each other are to be deformed, in order to allow the displacement of the fastening element along the oblong hole. The energy absorbed by the deformation element in the case of a crash thereby is increased.

In one exemplary design variant, the deformation element includes at least one elastically deformable portion. This elastically deformable portion exerts a restoring force on the fastening element, against which a deformation of the deformation element is effected at least along a partial region of a permitted deformation path, when the specified (force or acceleration) threshold value is exceeded in the case of a crash. Even in the case of a possible excessive loading of the backrest structure apart from a crash case, the fastening element can be held in a specifiable position with its bearing portion inside the oblong hole, in that the elastically deformable portion of the deformation element always moves (pulls and/or presses) the fastening element back into the specified position, when an increased (misuse) force only briefly has acted on the backrest structure. In this way, it can permanently be ensured that in the case of a crash the deformation element and the fastening element are in a certain specified position and for energy absorption the maximum possible deformation path is provided.

In one exemplary design variant, two elastic portions spaced from each other and possibly formed constructively different from each other are provided at the deformation element. These elastic portions for example each can extend between a connecting point of the deformation element and the portion of the deformation element connected or provided with the fastening element. During the deformation of the deformation element in the case of a crash, the respective elastic portion can be stretched or upset against the restoring force inherent in the same, in order to counteract a movement of the fastening element along the oblong hole and thereby absorb energy.

In one exemplary embodiment, an elastically deformable portion is formed by a portion of the deformation element which in the position of use of the backrest structure has a wave-shaped contour or a Z-shaped contour. A deformation element which here preferably is formed to be substantially longitudinally extended correspondingly has a geometry or shape which allows the deformation element to undergo an elastic change in length.

In the present case, a wave-shaped contour of the deformation element is assumed, when the deformation element has at least two (rounded or pointed) elevations as seen in a side view, which point into a normal direction which extends substantially vertically to a direction of extension of the deformation element. In the present case, in particular a W- or M-shaped contour is regarded as wave-shaped.

In one exemplary design variant, the deformation element can be formed with an elastically deformable portion with wave-shaped contour such that after an exceedance of the specified threshold value and a further action of an increased force (lying above the threshold value) on the backrest structure the elastically deformable portion is stretched, until the fastening element reaches an end of the oblong hole.

When the end of the oblong hole is reached, a movement of the fastening element is stopped and a further displacement of the fastening element without deformation of the seat component including the oblong hole is excluded. The fastening element itself can directly strike against an edge of the oblong hole or a spacer at least partly surrounding the bearing portion of the fastening element and likewise engaging into the oblong hole.

Alternatively or in addition, the deformation element is formed with an elastically deformable portion with Z-shaped contour such that after an exceedance of the specified threshold value and a further action of an increased force on the backrest structure the elastically deformable portion is upset, until the fastening element reaches an end of the oblong hole. The deformation element and its fixation at the seat component provided with the oblong hole preferably are formed such that the elastically deformable portion with the originally Z-shaped contour is upset to such an extent that it has adopted a substantially S-shaped contour when the fastening element reaches the end of the oblong hole.

In one exemplary design variant, the two variants described last are combined, so that the deformation element includes both a (first) elastic portion with Z-shaped contour and a (second) elastic portion with wave-shaped contour. For example, the deformation element is formed such that in the case of a crash the first portion is upset and the second portion is stretched, in order to permit a selective displacement of the backrest-side seat component (together with the backrest structure) relative to the seat-part-side seat component.

In one exemplary development, the deformation element is formed such that along a deformation path permitted via the oblong hole first an elastic deformation in the at least one deformable portion and subsequently a plastic deformation of the deformation element takes place, when the threshold value is exceeded and in the case of a crash an increased force acts on the backrest structure. Thus, in the case of a crash an elastic deformation of the deformation element initially is effected, so that the same in principle still might return into its original shape. With continued application of force, a permanent plastic deformation of the deformation element is effected. This plastic deformation (initially) ends when the fastening element reaches the end of the oblong hole.

A further deformation of the deformation element and now also of the seat component carrying the deformation element above all is effected here in the case of a crash with high speeds and hence with a continued increased application of force on the backrest structure even after covering the deformation path specified by the oblong hole. In this way, a corresponding deformation device is able to master three different system states:

- no (permanent) deformation of the deformation element in normal driving operation and with possibly improper handling of the vehicle seat,
- selective elastic and plastic deformation in the case of a crash (in particular in the case of a rear-end impact) in the lower speed range, and
- deformation stopped again at higher loads or speeds and absorption of still acting forces by deformation of the deformation element and the seat component carrying the deformation element.

The seat part component equipped with the oblong hole and the deformation element is deformed, for example, when the fastening element has reached the end of the oblong hole and as a result of a rear-end impact with high speed the backrest structure must be prevented from being shifted further relative to the seat part even after the end of the deformation path specified by the oblong hole.

To enable the fastening element to slide along the oblong hole as smoothly as possible in the case of a crash and to allow the deformation of the deformation element to proceed selectively (along a specified direction of deformation), the deformation element preferably is connected with the seat component including the oblong hole via the fastening element such that the deformation element is spaced from the portions of the other seat component enclosing the oblong hole. In this way, it should be prevented that the deformation element frictionally rests against the edge of the oblong hole, and as a result the deformation element possibly is not deformed as specified. Seizing or jamming of the deformation element in the case of a crash thus is selectively avoided.

Preferably, a spacer is provided, in order to space the deformation element from the other seat component in the region of the oblong hole. Such spacer for example can be formed by a separate sleeve surrounding the bearing portion of the fastening element. Alternatively, a portion of the deformation element, through which the fastening element is put, can serve as spacer, wherein this portion engages into the oblong hole and at least partly surrounds the bearing portion of the fastening element. Such portion in particular can be formed by a rim hole at the deformation element, which with an (annular) collar protrudes in direction of the other seat component at the deformation element, which does not include the oblong hole.

A preferred design variant furthermore is characterized in that on a first side of the seat component including the oblong hole the deformation element is fixed at this seat component and a portion of the other seat component fixed at the fastening element is arranged on a second side of the one seat component opposite the first side. In such variant, for example, the deformation element thus is fixed on a first side of the seat part component and a portion of the backrest component fixed at the fastening element faces the second side of the seat part component. Consequently, the portion of the seat part component provided with the oblong hole here extends between the deformation element and the backrest component.

Advantageously, the deformation element is fixed at the associated seat component by welding, in order to be able to (subsequently) mount the deformation element at the seat component effectively and at low cost.

In one exemplary embodiment, the deformation element furthermore forms a positioning pin which serves for properly aligning the backrest structure relative to the seat part during assembly of the seat and which in the case of a crash is deformable by a portion of one of the seat components, in order to additionally, i.e. in particular in addition to a deformable portion between a connecting point of the deformation element and the fastening element, counteract a displacement of the backrest structure. Here, the deformation element consequently integrates an additional function, which does not primarily serve the absorption of crash-related forces.

In one exemplary design variant, the deformation element is made of a so-called TWIP material, in order to permit a comparatively high elongation (about 40%) of the deformation element in the case of a crash and hence permit a desired displacement of the fastening element along the oblong hole. The deformation element for example can be made of a so-called TWIP steel. The abbreviation TWIP stands for the English technical term "Twinning Induced Plasticity" and designates a material in which a solidification occurs during a plastic deformation and hence the elongation at break is comparatively high.

In principle, a vehicle seat according to the invention in particular can be equipped and provided for the driver side or the passenger side of a motor vehicle or also for the second or third seat row.

The backrest component for example can immovably be fixed directly at a backrest frame of the backrest structure, e.g. with a non-foldable vehicle seat for the rear seat row, or in a position of use it is locked in place with the backrest frame of the backrest structure via an adjusting means and hence is connected with the backrest structure such that in the case of a crash a displacement of the backrest structure relative to the backrest component is blocked.

BRIEF DESCRIPTION OF THE DRAWINGS

Further advantages and features of the present invention will become apparent from the following description of an exemplary embodiment with reference to the Figures.

DETAILED DESCRIPTION

FIGS. 1A-1B, 2 and 3 show different views and different phases of an assembly of a vehicle seat according to the invention with a seat-part-side seat component S (seat part component) and a backrest-side seat part component L (backrest component) of the vehicle seat, which is fixed thereto. The seat part component S is immovably fixed at a non-illustrated seat part of the vehicle seat, which carries a seat cushion of the vehicle seat. The backrest component L in turn is connected with a non-illustrated backrest structure of the vehicle seat, on which a backrest cushion is arranged for supporting the back of a seat user. The backrest component L is fixed at a backrest frame of the backrest structure or in a position of use of the backrest structure locked with a backrest frame, e.g. via an adjusting means with a detent or rotary fitting, so that forces acting on the backrest structure present (and arrested) in a position of use are introduced into the seat part or its seat part component S in particular via the backrest component L. The backrest structure can rotatably be mounted, in order to be able to pivot the backrest structure relative to the seat part for adjusting a desired seating position and/or for completely folding down the backrest.

Position of use of the backrest structure here is understood to be a position of the backrest structure relative to the seat part, in which a seat user can take a seat on the vehicle seat during a normal driving operation and his back can be supported by the backrest structure.

Figure 1A:
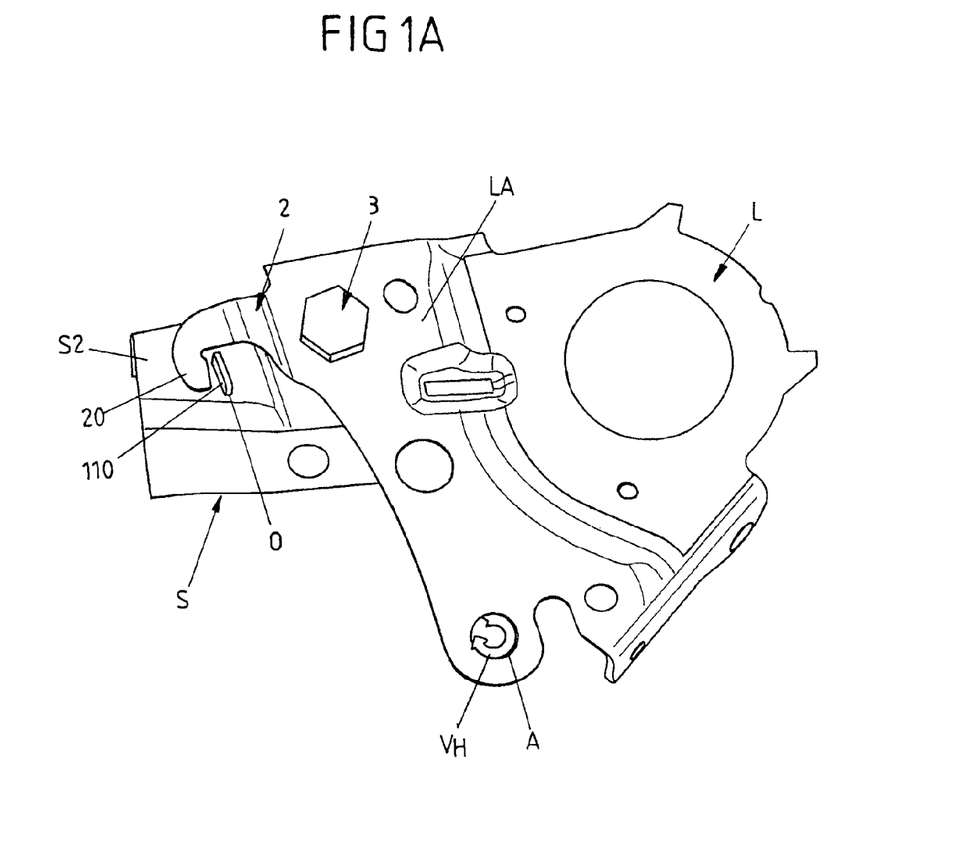
FIG. 1A shows a perspective view of an exemplary embodiment of an assembly of a vehicle seat according to the invention with a seat part component of a seat part together with a backrest component fixed thereto for connection with a backrest structure looking at a first side.
Figure 1B:
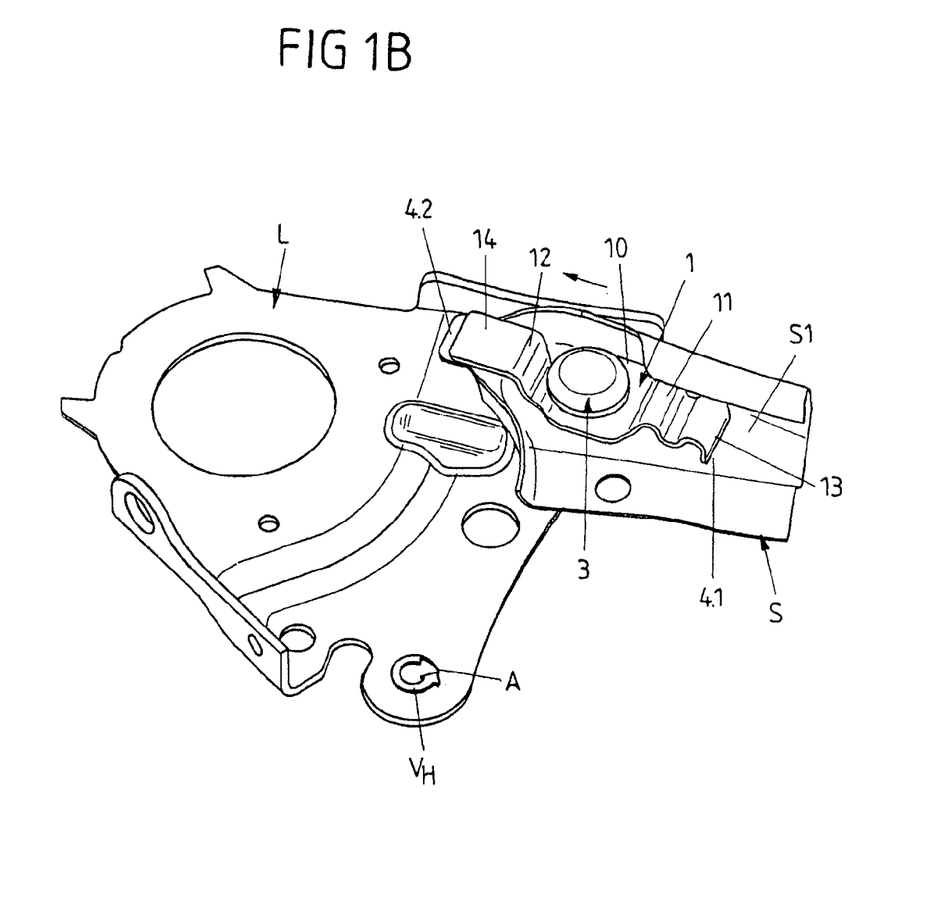
FIG. 1B shows a perspective view of the assembly of FIG. 1A looking at a second side opposite the first side.

In a proper position of use of the backrest structure, the assembly of the vehicle seat as shown in FIGS. 1A-1B, 2 and 3 is arrested in the relative position shown in FIGS. 1A and 1B. The backrest component L is fixed at the seat part component S such that in particular proper pivoting of the backrest structure relative to the seat part for adjusting a desired seating position or for folding down the backrest onto the seat cushion does not lead to a displacement of the backrest component L with respect to the seat part component S. For this purpose, the backrest component L on the one hand here is fixed at a fixing point A, which here serves as first, lower screwing point, and on the other hand at a fastening portion LA spatially spaced therefrom with a second, upper screwing point, fixed at the seat part component S and hence at the seat part.

A displacement of the backrest component L relative to the seat part component S here is permitted only with a force acting on the backrest structure and exceeding a threshold value, as it is generated in particular in the case of a rear-end impact with a seat user seated on the vehicle seat. For this purpose, the seat part component S is formed with an oblong hole 5 (see FIGS. 2 and 3) as part of a deformation device and in addition carries a deformation element 1 of the deformation device in the form of a longitudinally extending panel. In the case of a crash, the deformation device permits a relative movement of the backrest component L with respect to the seat part component S by deforming the deformation element 1. This relative movement of the backrest component L relative to the seat part component S serves the reduction of the energy generated in the case of a crash, in order to reduce the loads caused on the seat user by the acceleration, which in particular in situations of a rear-end impact can lead to a cervical spine trauma. A displacement of the backrest component L relative to the seat part component S here consequently is effected by deforming the deformation element 1, so that at least a part of the energy acting on the backrest structure in the case of a crash is reduced by the deformation of the deformation element 1.

As can be taken from the synopsis of FIGS. 1A-1B, 2 and 3, the deformation element 1 on a first side of the seat part component S is fixed at two connecting points 4.1 and 4.2 spaced from each other on a side face S1 of the seat part component S (via two welds). Via a fastening element 3 in the form of a screw bolt, the deformation element 1 in addition is connected with the two seat components—the backrest component L on the one hand and the seat part component S on the other hand. For this purpose, the fastening element 3 one after the other extends through a through opening in a fastening portion 10 of the deformation element 1 formed between the two connecting points 4.1 and 4.2, and through the oblong hole 5 of the seat part component S and a through bore at the backrest component L. The fixation of the fastening element 3 at the deformation element 1 and the backrest component L here is effected via a nut screwed onto the fastening element 3 at the portion guided through the backrest component L. The deformation element 1 thus is fixed at the seat component S on a first side of the seat part component S and the fastening portion LA of the backrest component L fixed at the fastening element 3 is arranged on the second side of the seat part component opposite the first side. The portion of the seat part component S forming the oblong hole 5 thus is located between the deformation element 1 and the fastening portion LA of the backrest component L.

The deformation element 1 is formed such that it holds the fastening element 3 fixed at the backrest component L in a position relative to the seat part component S, when no crash-related forces act on the backrest structure. A bearing portion 35 of the fastening element 3 engaging into the oblong hole 5 thus is held in a specified position inside the oblong hole 5. A displacement of the fastening element 3 along the oblong hole 5 and relative to the seat part component S correspondingly is counteracted by the deformation element 1 and is blocked in a proper position of use of the backrest structure and in particular during a normal use of the vehicle seat.

Due to the fixation of the fastening element 3 at the backrest component L and at the separate deformation element 1 as well as the guidance of the fastening element 3 in the oblong hole 5 of the seat part component S a displacement of the backrest component L relative to the seat part component S, however, is permitted when a force exerted by the backrest structure on the backrest component L exceeds a specified threshold value and is so large that the backrest component L rotates about the fixing point A along a swivel direction $V_H$ and thereby can effect a deformation of the deformation element 1.

Thus, when a critical force or acceleration threshold value is exceeded, the fastening element 3 can move along the oblong hole 5 of the seat part component S by deforming the deformation element, as is indicated by the arrow in FIG. 1B. The deformation element 1 welded to the seat part component S at the connecting points 4.1 and 4.2 (initially) is deformed in elastically deformable deforming portions 11, 12 provided for this purpose.

A first elastically deformable deforming portion 11 is formed by a wave-shaped contour, here M-shaped in a side view, of the deformation element 1 between the fastening portion 10 and the one connecting point 4.1. In particular, due to this concertina-like deforming portion 11 of the deformation element 1 the deformation element 1 has a certain elasticity, due to which the deformation element 1 strives to maintain the original shape shown in FIG. 1B. In the case of a crash this deforming portion 11 is stretched, so that for the displacement of the backrest component L about the fixing point A a non-negligible amount of the kinetic energy acting on the backrest structure must be applied.

In the second deforming portion 12 formed between the further connecting point 4.2 and the fastening portion 10, the deformation element 1 has a Z-shaped contour. Via the Z-shaped contour, an additional elasticity likewise is imparted to the deformation element 1. During a displacement of the backrest component L in the case of a crash the deforming portion 12 is upset, so that also because of this the shifting movement of the backrest component L is slowed down.

The two ends of the deformation element 1 located on the first side face S1 are formed by connecting portions 13, 14. The first connecting portion 13 adjoins the first deforming portion 11 with the wave-shaped contour in direction of the first connecting point 4.1, while the second connecting portion 14 adjoins the second deforming portion 12 with the Z-shaped contour in direction of the second connecting point 4.2. Via both connecting portions 13, 14 the deformation element 1 is welded to the seat part component S. In this way, the fastening portion 10 of the deformation element 1 connected with the fastening element 3 lies between the two connecting points 4.1, 4.2 and between the two elastically deformable deforming portions 11, 12 (proceeding from the original position corresponding to FIG. 1B).

FIGS. 1A and 1B furthermore reveal that the deformation element 1 forms a positioning pin 110 put through a cutout O of the seat part component S. This positioning pin 110 consequently is guided from the first side face S1 through the seat part component S, so that the positioning pin 110 protrudes from the opposite side face S2. This positioning pin 110 serves the alignment of the backrest component L relative to the seat part component S during assembly of the vehicle seat. For this purpose, an alignment portion 2 with a hook-shaped partial region 20 is provided at the seat part component L, which can strike against the protruding positioning pin 110 via a contact surface, whereby an excessive or inadmissible tilting of the backrest component L relative to the seat part component S during the assembly is prevented.

Figure 2:
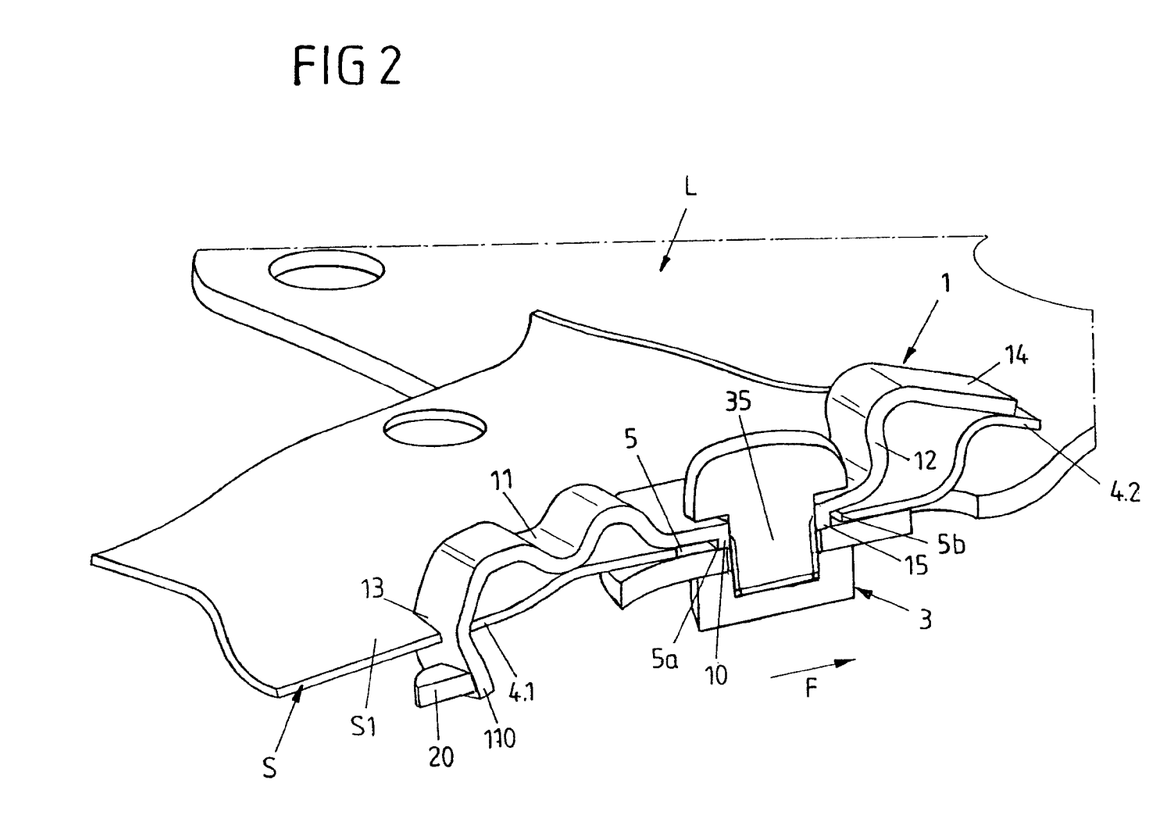
FIG. 2 shows an enlarged sectional view of the assembly of FIGS. 1A and 1B after a crash-related deformation of a deformation element of the assembly and a crash-related displacement of the backrest component relative to the seat part component.
Figure 3:
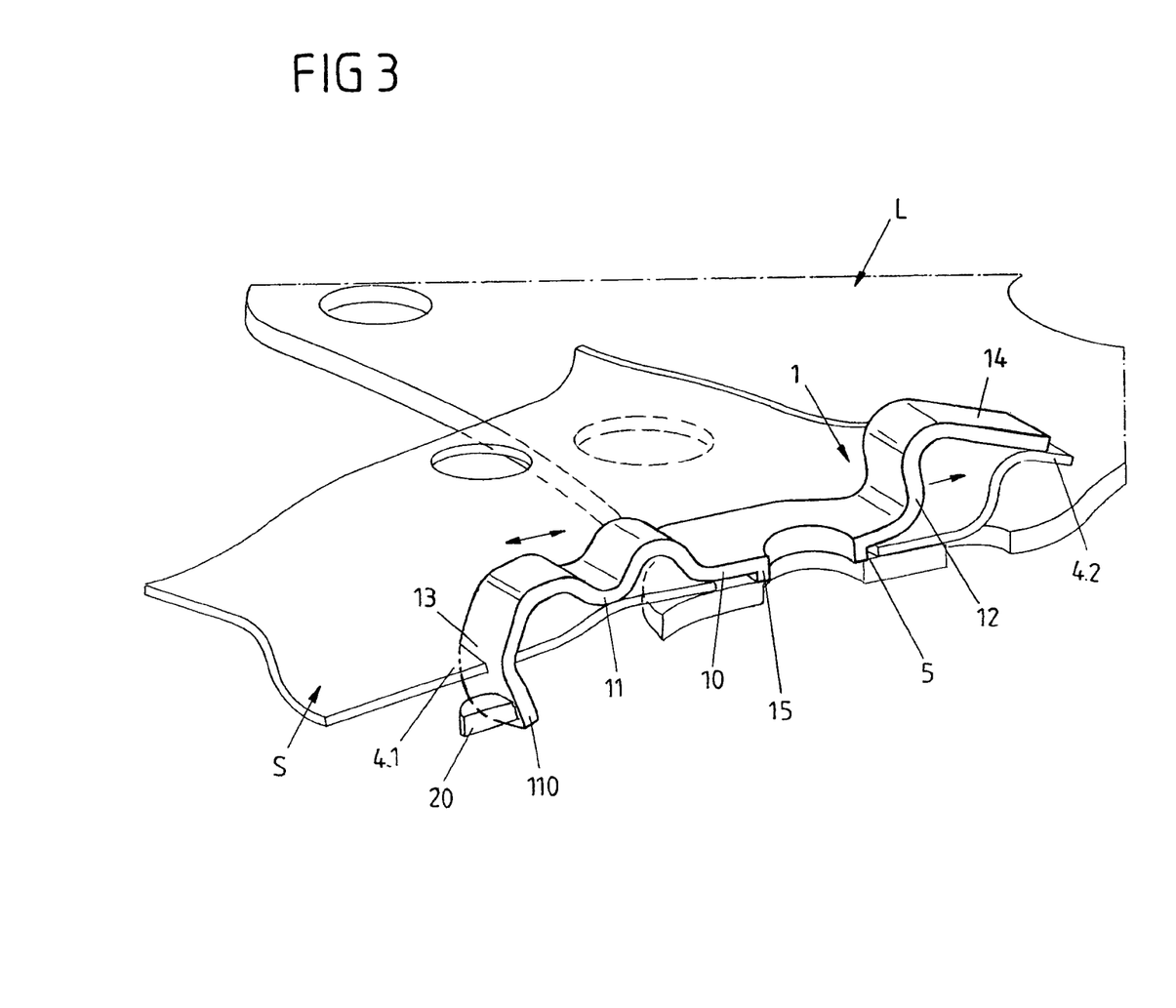
FIG. 3 in a view matching with FIG. 2 shows the assembly of FIGS. 1A and 1B with highlighted deformation element.

FIGS. 2 and 3 illustrate the deformations at the deformation element 1 and at the seat part component S occurring in the case of a crash. The fastening element 3 thereby has been shifted along a maximum admissible deformation path, which is specified by the oblong hole 5 provided in the seat part component S.

In the case of a crash, a (deformation) force F acts on the fastening element 3, which leads to a displacement of the backrest component L relative to the seat part component S by deforming the deformation element 1. The fastening element 3, which is (slidingly) guided in the oblong hole 5 via its bearing portion 35, is shifted in direction of an oblong hole end 5*b* of the oblong hole 5. In a first partial region of a deformation path permitted by the oblong hole 5 the deformation element 1 initially is elastically deformed in its deforming portions 11, 12 and subsequently plastically deformed in a further partial region, before the fastening element 3 reaches the oblong hole end 5*b*. The fastening element 3 has reached the oblong hole end 5*b*, when the bearing portion 35 engaging into the oblong hole 5 is prevented from being shifted further by an edge located in direction of longitudinal extension of the oblong hole. A displacement of the backrest component L thereby is stopped especially in the case of a crash with higher speeds, in order to prevent that the backrest or the backrest structure is shifted further and takes a relative position with respect to the seat part which is disadvantageous for the seat user, i.e. involves a greater risk of injury. The further displacement of the backrest structure and hence of the backrest component L correspondingly is counteracted both by the deformation element 1 and by the seat part component S, when the deformation path specified by the oblong hole 5, along which the deforming portions 11, 12 of the deformation element 1 are deformed selectively, has been covered by the fastening element 3. In the case of a crash, in particular a rear-end crash with high speed, the deformation element 1 correspondingly initially is deformed elastically, then plastically, in its deforming portions 11, 12, before the fastening element 3 cannot be shifted anymore inside the oblong hole 5 and with still increased force F the seat part component S also is deformed, in order to slow down and finally stop a shifting movement of the backrest structure relative to the seat part or of the backrest component L relative to the seat part component S.

As a result, in driving operation the deformation element 1 thus counteracts a displacement of a backrest screw connection provided via a fastening element 3. In the case of a crash, the deformation element however is deformable selectively, in order to permit a displacement of the fastening element 3 along the seat-part-side oblong hole 5 and hence a displacement of the backrest structure, in order to avoid a cervical spine trauma.

The deformation element 1 with its second deformation portion 12 here is formed such that the original Z-shaped contour (FIG. 1B) is transferred into an S-shaped contour (FIGS. 2 and 3), when the fastening element 3 has covered the maximum permitted deformation path along the oblong hole 5. A selective introduction of force into the seat part component S via the connecting portion 14 thereby can be ensured when the fastening element 3 is present in the region of the one oblong hole end 5*b* and hence at a (preliminary) end of the deformation path.

From FIGS. 2 and 3 it can furthermore be seen that in the case of a crash the backrest component L also acts on the positioning pin 110 via its alignment portion 2 and bends said pin. Due to this deformation of the positioning pin 110, additional energy correspondingly can be reduced in the case of a crash. However, the energy absorbed by the deformation of the deformation element 1 in its deforming portions 11, 12 here by a multiple outweighs the energy which is absorbed by the deformation of the positioning pin 110, in order to slow down the shifting movement of the backrest component L.

From FIGS. 2 and 3 it can also be seen that the fastening element 3 is held in a spacer 15 of the deformation element 1 formed as rim hole and the bearing portion 35 is annularly surrounded by this spacer inside the oblong hole 5. The spacer 15 protrudes from the fastening portion 10 like a collar in direction of the backrest component L and thereby ensures that the deformation element 1 with its fastening portion 10 is spaced from the portions enclosing the oblong hole 5 on the first side face S1 of the seat part component S. It should thereby be avoided that when tightening the fastening element 3 formed as screw bolt, the fastening portion 10 of the deformation element 1 gets in frictional contact with the seat part component S. Seizing of the deformation element 1 thus is reliably excluded by the spacer 15, so that in the case of a crash the required deformation of the two deforming portions 11, 12—and possibly in addition the deformation of the positioning pin 110—(initially) exclusively counteracts a displacement of the fastening element 3 along the oblong hole 5 and hence a displacement of the backrest component L with respect to the seat part component S. The fastening element 3 thus can be guided along the oblong hole 5 with comparatively little friction, so that the selective deformation of the deformation element 1 is not negatively influenced by a possible seizure of the deformation element 1 at the seat part component S or by a possible jamming of the fastening element 3 in the oblong hole 5.

Instead of the spacer 15 formed by the rim hole, there can of course also be provided a separate sleeve which ensures a minimum distance between the deformation element 1 or its fastening portion 10 and the seat part component S, when the fastening element 3 is properly fixed at the backrest component L—for example by a threaded nut.

Figure 4:
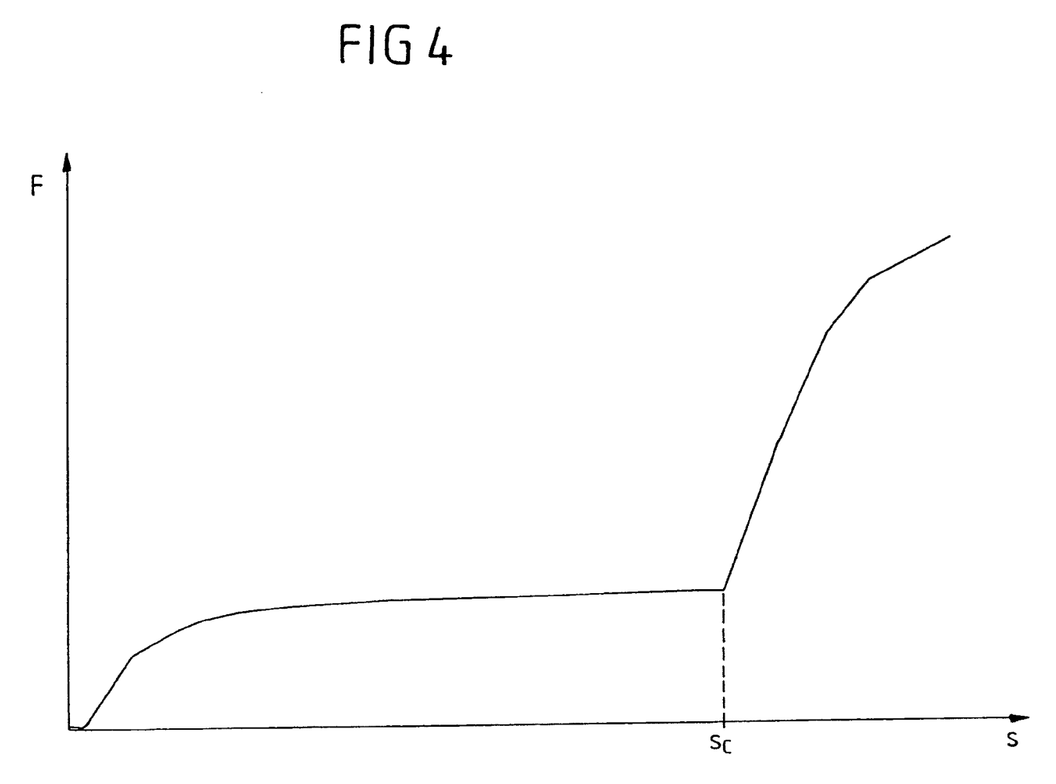
FIG. 4 shows a force-path diagram for a fastening element shiftably guided in an oblong hole of the assembly of FIGS. 1A and 1B in the case of a crash.

With the diagram of FIG. 4, in which a force F acting on the fastening element 3 is plotted over the shifting path s covered by the fastening element 3 in the case of a crash, the mode of operation of the assembly shown in the preceding Figures and of the vehicle seat equipped therewith is illustrated once again.

The fastening element 3, which in a position of use of the vehicle seat or the backrest structure is held in the vicinity of a first oblong hole end 5a, is accelerated in the case of a crash due to the force exceeding a specified threshold value. The backrest component L thereby can be shifted relative to the seat part component S by deforming the deformation element 1. During the displacement of the fastening element 3 along the oblong hole 5, the same initially experiences a rising force, until the restoring force of the elastically deformable deforming portions 11, 12 has been overcome completely and the plastic deformation of the deformation element 1 starts. Consequently, an almost constant force acts on the fastening element 3, until the oblong hole end 5b is reached.

When the spacer 15 and hence the fastening element 3 (indirectly) strikes against the edge of the oblong hole end 5b, the maximum deformation path $s_c$ permitted by the oblong hole 5 is reached and the shifting movement of the fastening element 3 along the oblong hole 5 (initially) is stopped. As a result of the high forces occurring here in the case of a crash, the fastening element 3 however is shifted further, wherein here not only the deformation element 1 is deformed, but also the seat part component S. Correspondingly, the force F acting on the fastening element 3 rises steeply, until for example the fastening element 3 would fail.

Instead of the deformation element 1 as shown in FIGS. 1B, 2 and 3 with selectively incorporated deforming portions 11, 12, which minimize elongations in the deformation element 1 and permit a sufficient, failure-free deformation of the deformation element 1 due to an adapted shape, there can also be provided a deformation element of a material with very high elongation or elongation at break. Thus, the permitted deformation path also can be produced (exclusively) via the elongation/lengthening of a material cross-section, in order to initially hold the fastening element 3 in position in a position of use and in the case of a crash thus permit its displacement over the desired deformation path $s_c$ along the oblong hole 5. There can be employed for example so-called TWIP materials.

With the inventive formation with two seat components coupled to each other via a deformation element and a fastening element a simple possibility is provided, in order to permit a displacement of a backrest structure of a vehicle seat relative to a seat part in the case of a crash, in particular in the case of a rear-end impact, thereby reduce crash-related energy and again stop the displacement after covering a permitted deformation path. This is achieved with a small number of lightweight components and in particular also can help to prevent an enlargement of holes in seat part components with small wall thickness. In the case of a crash, for example, the seat part component S is deformed to a distinctly smaller extent when the deformation element 1 is used, than with a simple screw connection of the backrest component L with the seat part component S at the fastening portion LA of the backrest component L.

The invention claimed is:

1. A vehicle seat comprising:
   a seat part comprising a first seat component;
   a backrest structure comprising a second seat component, wherein the first seat component is fixed to the second seat component when the backrest structure is present in a use position;
   a deformation device with at least one deformation element fixed at one of the first or second seat components to permit a displacement of the second seat component relative to the first seat component by allowing deformation of the at least one deformation element when a force exceeding a threshold value acts on the backrest structure,
   the deformation device including at least one oblong hole which defines a deformation path along which a displacement of the second seat component is configured to be effected after exceedance of the threshold value; and
   a fastening element, which fixes the deformation element and the one of the seat components to each other, the fastening element having a bearing portion engaging the oblong hole, and which is held in a specified position by the deformation element when the backrest structure is in the use position,
   wherein the deformation element is fixed at the one of the seat components on at least two connecting points spaced from the oblong hole, wherein the deformation element is fixedly attached to the one of the seat components independently from the fastening element so that at least one deformable portion of the deformation element extends between one of the at least two connecting points and wherein the fastening element is fixed at a portion of the deformation element which is located between the at least two connecting points of the deformation element, and
   wherein the deformation element is connected with the one of the seat components at one or more locations other than the oblong hole via the fastening element such that a portion of the deformation element is spaced from a portion of the one of the seat components enclosing the oblong hole.

2. The vehicle seat according to claim 1, wherein the deformation element is configured to be deformed upon exceedance of the specified threshold value and thereby permits a displacement of the fastening element along the oblong hole.

3. The vehicle seat according to claim 1, wherein the deformation element includes at least one elastically deformable portion which is configured to exert a restoring force on the fastening element against which a deformation of the deformation element is effected at least along a partial region of a permitted deformation path when the specified threshold value is exceeded.

4. The vehicle seat according to claim 3, wherein the at least one elastically deformable portion of the deformation element is defined by a wave-shaped contour or by a Z-shaped contour.

5. The vehicle seat according to claim 4, wherein the deformation element having the Z-shaped contour is configured to be deformed after an exceedance of the specified threshold value and by a further action of an increased force on the backrest structure, until the fastening element reaches an end of the oblong hole.

6. The vehicle seat according to claim 4, wherein the deformation element is configured to be stretched after an exceedance of the specified threshold value and by a further action of an increased force on the backrest structure, until the fastening element reaches an end of the oblong hole.

7. The vehicle seat according to claim 3, wherein at least two elastically deformable portions are provided.

8. The vehicle seat according to claim 3, wherein, when the specified threshold value is exceeded and an increased force acts on the backrest structure, the deformation element is configured to elastically deform at the at least one elastically deformable portion and to subsequently plastically deform along a deformation path defined by the oblong hole.

9. The vehicle seat according to claim 1, wherein a spacer is provided in order to space the deformation element from the first or second seat component in a region of the oblong hole.

10. The vehicle seat according to claim 9, wherein the spacer comprises a separate sleeve or a portion of the deformation element engaging into the oblong hole, in particular a rim hole.

11. The vehicle seat according to claim 1, wherein the deformation element is fixed at the seat part or the backrest structure.

12. The vehicle seat according to claim 1, wherein the deformation element comprises a positioning pin which serves to properly align the backrest structure relative to the seat part during assembly of the seat and which is deformable by a portion of the one of the seat components in order to additionally counteract a displacement of the second seat component.

13. A vehicle seat according to claim 1, wherein
the deformation element extends through an opening of the one of the seat components.

14. A vehicle seat comprising:
a seat part comprising a first seat component;
a backrest structure comprising a second seat component, wherein the first seat component is fixed to the second seat component when the backrest structure is present in a use position;
a deformation device with at least one deformation element fixed at one of the first or second seat components to permit a displacement of the second seat component relative to the first seat component by allowing deformation of the at least one deformation element when a force exceeding a threshold value acts on the backrest structure,
the deformation device including at least one oblong hole which defines a deformation path along which a displacement of the second seat component is configured to be effected after exceedance of the threshold value; and
a fastening element, which fixes the deformation element and the one of the seat components to each other, the fastening element having a bearing portion engaging the oblong hole, and which is held in a specified position by the deformation element when the backrest structure is in the use position,
wherein the deformation element is fixed at the one of the seat components on at least two connecting points spaced from the oblong hole, wherein the deformation element is fixedly attached to the one of the seat components independently from the fastening element so that at least one deformable portion of the deformation element extends between one of the at least two connecting points and wherein the fastening element is fixed at a portion of the deformation element which is located between the at least two connecting points of the deformation element, and
wherein the deformation element is connected with the one of the seat components at one or more locations other than the oblong hole via the fastening element such that a portion of the deformation element is spaced from a portion of the one of the seat components enclosing the oblong hole
wherein the deformation element is fixed at a first side of the one seat component and a portion of the other seat component connected with the fastening element is located on a second side of the one seat component opposite the first side.

15. A vehicle seat according to claim 14, wherein the deformation element comprises a positioning pin which serves to properly align the backrest structure relative to the seat part during assembly of the seat and which is deformable by a portion of the one of the seat components in order to additionally counteract a displacement of the second seat component.

16. The vehicle seat according to claim 14, wherein the deformation element includes at least one elastically deformable portion which, when the specified threshold value is exceeded, is configured to exert a restoring force on the fastening element against which a deformation of the deformation element is effected at least along a partial region of a permitted deformation path.

17. The vehicle seat according to claim 16, wherein the at least one elastically deformable portion is defined in the use position of the backrest structure by a wave-shaped contour or by a Z-shaped contour of the deformation element.

18. The vehicle seat according to claim 17, wherein the deformation element having the Z-shaped contour is configured to be deformed after an exceedance of the specified threshold value and by a further action of an increased force on the backrest structure until the fastening element reaches an end of the oblong hole.

19. The vehicle seat according to claim 17, wherein the deformation element is configured to be stretched after an exceedance of the specified threshold value and by a further action of an increased force on the backrest structure, until the fastening element reaches an end of the oblong hole.

20. The vehicle seat according to claim 17, wherein at least two elastically deformable portions are provided.

21. The vehicle seat according to claim 16, wherein, when the specified threshold value is exceeded and an increased force acts on the backrest structure, the deformation element is configured to elastically deform the at least one elastically deformable portion and to subsequently plastically deform along a deformation path defined by the oblong hole.

* * * * *